United States Patent [19]

Jeon

[11] Patent Number: 5,629,779
[45] Date of Patent: May 13, 1997

[54] IMAGE CODING METHOD AND APPARATUS THEREFOR

[75] Inventor: Jong-gu Jeon, Suwon, Rep. of Korea

[73] Assignee: Samsung Electronics Co., Ltd., Kyungki-do, Rep. of Korea

[21] Appl. No.: 337,836

[22] Filed: Nov. 8, 1994

[30] Foreign Application Priority Data

Jan. 12, 1994 [KR] Rep. of Korea ............... 94-411

[51] Int. Cl.$^6$ ............... H04N 1/415; H04N 1/419; H04N 7/12
[52] U.S. Cl. ............... 358/432; 358/261.1; 358/261.3; 348/384; 348/405
[58] Field of Search ............... 358/261.1, 261.2, 358/261.3, 432, 426, 433; 348/384, 395, 390, 396, 398, 405, 406, 420, 419, 250; 341/67, 200; 382/56, 251; H04N 1/415, 1/419

[56] References Cited

U.S. PATENT DOCUMENTS

| | | | |
|---|---|---|---|
| 5,086,488 | 2/1992 | Kato et al. | 358/261.1 |
| 5,168,375 | 12/1992 | Reisch et al. | 358/432 |
| 5,223,926 | 6/1993 | Stone et al. | 348/396 |
| 5,230,038 | 7/1993 | Fielder et al. | 395/2 |
| 5,260,808 | 11/1993 | Fujii | 358/433 |
| 5,263,100 | 11/1993 | Kim et al. | 358/433 |
| 5,278,646 | 1/1994 | Civanlar et al. | 358/133 |
| 5,331,427 | 7/1994 | Namizuka | 358/433 |
| 5,377,051 | 12/1994 | Lane et al. | 360/33.1 |
| 5,408,274 | 4/1995 | Chang et al. | 348/700 |
| 5,440,404 | 8/1995 | Okamoto | 358/261.1 |
| 5,444,490 | 8/1995 | With | 348/423 |
| 5,444,542 | 8/1995 | Hoshi et al. | 358/261.1 |
| 5,475,502 | 12/1995 | Lee et al. | 358/432 |

*Primary Examiner*—Edward E. Coles, Sr.
*Assistant Examiner*—Madeleine Anh-Vinh Nguyen
*Attorney, Agent, or Firm*—Sughrue, Mion, Zinn, Macpeak & Seas

[57] ABSTRACT

An image coding method includes the steps of producing a complexity normalizing signal for respective macro blocks based on a complexity in a space domain with regard to an input image, producing a zero coefficient sum by performing a discrete cosine transform operation on the input image and counting the discrete cosine transform coefficients from −1 to +1, producing a zero coefficient normalizing value for respective macro blocks in accordance with the zero coefficient sum; producing a transient weight signal for respective macro blocks in accordance with the zero coefficient sum and a predetermined compression ratio, and summing the complexity normalizing signal, the zero coefficient normalizing value and the transient weight signal so as to produce the scale factor. The quantization step size of the discrete cosine transform coefficients is controlled in a macro block in accordance with the scale factor. Thus, image frames having various complexities can be encoded at a constant bit rate with no deterioration of the image.

13 Claims, 4 Drawing Sheets

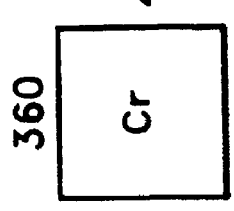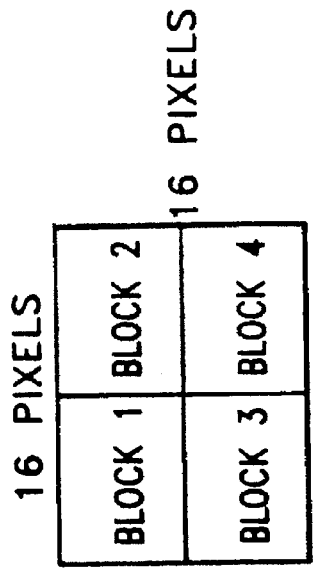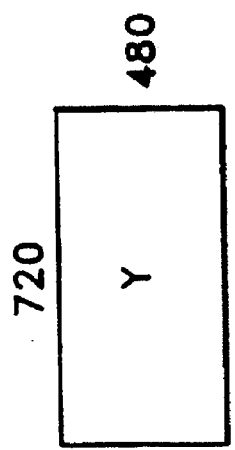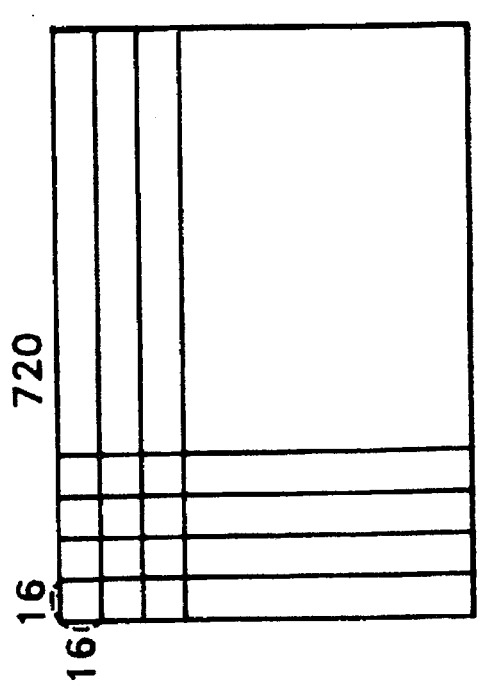

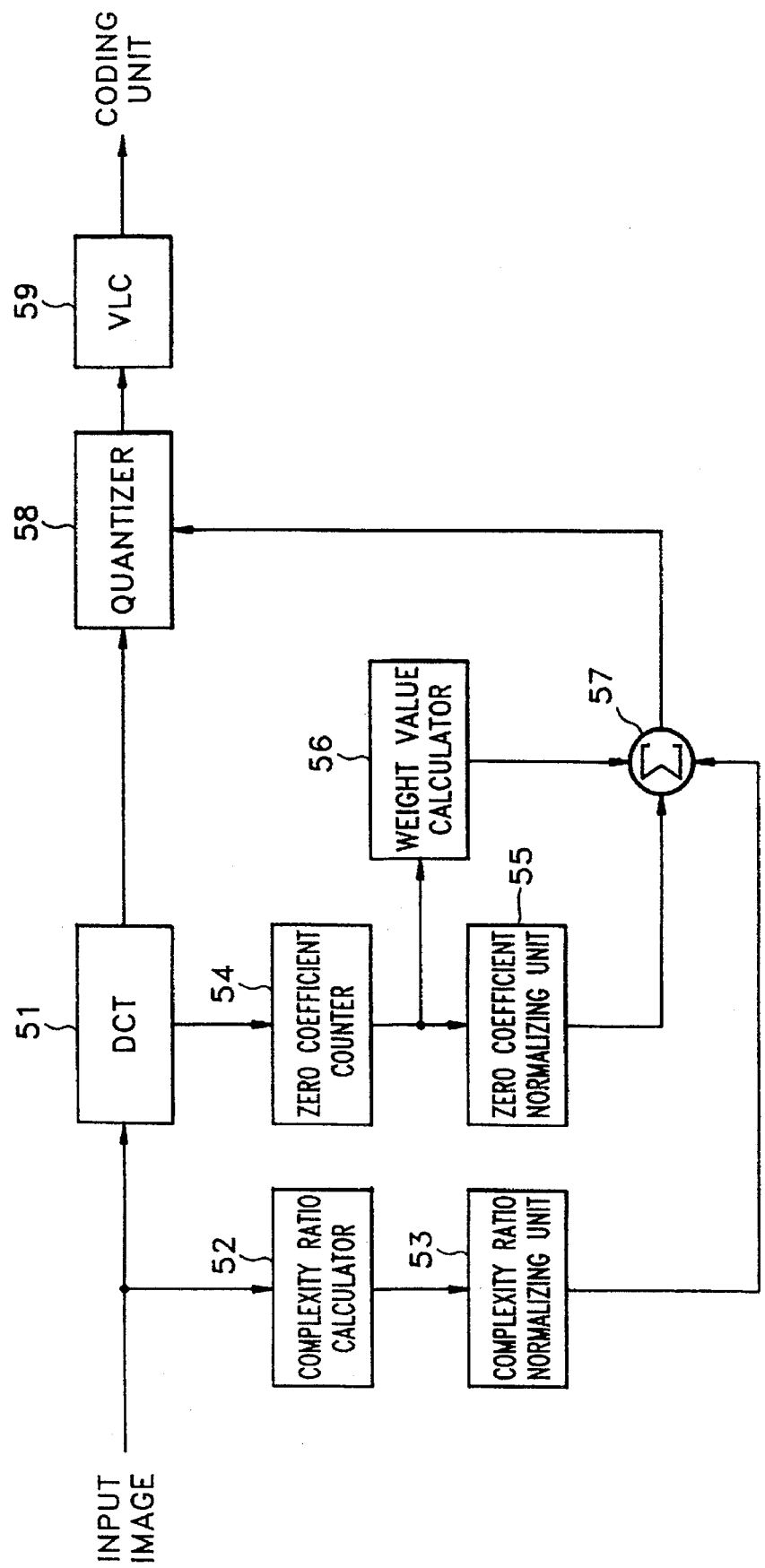

IMAGE CODING METHOD AND APPARATUS THEREFOR

BACKGROUND OF THE INVENTION

The present invention relates to an image coding method and apparatus therefor, and more particularly, to an image coding method and apparatus therefor for obtaining a scale factor in accordance with the complexity of the image and then quantizing the image, so as to encode images having different complexities at a constant bit rate.

Storage and communication technologies have rapidly developed due to recent advancements in the fields of computers, semiconductor manufacturing and digital signal processing. Further development requires improved methods for effectively storing image information on a recording medium and for increasing the quality of a reproduced image, processed in a digital image apparatus such as a digital videocassette recorder, high-definition television, digital video camera, video phone or television phone set. Here, the quantity of data for a digital image signal is much larger than that for an analog image signal, so that compression of the image data is necessary in order to effectively use recording media and communication channels. Methods used for image signal compression include a discrete cosine transform (DCT) method and a variable-length coding (VLC) method.

FIG. 1 is a block diagram illustrating the structure of a conventional image signal coding apparatus. In FIG. 1, a DCT unit 11 receives an input time-domain image block having a constant size (e.g., 8×8 pixels) and produces 64 discrete cosine coefficients in the frequency domain. A quantizer 12 quantizes the discrete cosine coefficients output from DCT unit 11, using a predetermined quantization step size. Then, a variable length coding (VLC) unit 13 produces variable length encoded data, such that data of less quantity (or whose information value is lower) is allotted fewer bits and data of greater quantity (or whose information value is higher) is allotted more bits, thus minimizing the number of bits required for coding. Since the length of the data output from VLC unit 13 is not constant, a buffer 14 temporally stores this data so that encoded data can be output at a constant bit rate.

In the prior art, DCT unit 11 divides an input image into smaller images of 8×8 blocks and then independently processes each sub-divided image block. Quantizer 12 quantizes the DCT coefficients at the quantization step size obtained in accordance with the state of buffer 14 and the complexity of the current input image. Therefore, if the difference between the quantization step sizes of adjacent macro blocks is large, the correlation between adjacent blocks is lost along the borders, which leads to a "block effect" phenomenon.

In addition, when quantization is performed using a constant quantization step size on the respective macro blocks, errors occur nonuniformly in the frame. This is because the complexity of each block is different even within a given frame, which results in an artifact being produced whereby the image quality of a specific portion is deteriorated. Therefore, it is critical that a proper quantization step size should be determined in order to prevent generation of an artifact.

On the other hand, since the code length generated in the variable length coding is variable, reproduction is difficult when performing special reproducing functions, such as during a high speed search. Accordingly, the bit quantity must be controlled so as to be constant. Also, the quantization step size of the quantizing unit is determined by a scale factor, which is an important parameter for determining the bit rate, and in turn determines the compression ratio and affects the resolution of the frame.

However, as shown in FIG. 1, when a buffer 14 is used to provide a constant bit quantity, since the quantization step size is controlled by the fullness ratio of the buffer, or in other words the degree to which the buffer is full, there may be difficulty in the bit allocation for a specific region (or macro block) in adapting to the complexity of a frame.

Further, U.S. Pat. No. 5,253,075 discloses an image signal encoding/decoding system in which, after the complexity of a DCT transform block is detected, the quantization step size of the quantizer is adaptively controlled in accordance with the relationship of adjacent DCT transform blocks, so as to alleviate the block effect phenomenon. In such an apparatus, the complexity of an image is detected based on frequency domain information so as to control the quantization step size. However, such an image encoding/decoding system fails to provide a means for encoding a specific block (or macro block) at a constant bit rate.

SUMMARY OF THE INVENTION

Accordingly, an object of the present invention is to provide an image coding method for determining a scale factor, wherein encoded image data has a constant bit rate being adapted to the complexity detected for each subblock which is composed of a predetermined number of blocks.

Another object of the present invention is to provide an image coding method for controlling the quantization step size being adapted to the complexity detected in the space domain and frequency domain for each subblock.

Still another object of the present invention is to provide an image coding apparatus for obtaining a scale factor being adapted to the complexity detected per sub-block.

To attain the first two objects, there is provided an image coding method for dividing an input image into sub-block composed of a predetermined number of unit blocks, quantizing the divided image signal at a quantization step size which is determined in accordance with a scale factor, and then coding, the image coding method comprising the steps of:

producing a complexity normalizing value of respective sub-blocks, based on a complexity in the space domain with regard to the input image;

producing a zero coefficient sum by performing a discrete cosine transform operation on the input image and counting the discrete cosine transform coefficients within a predetermined range;

producing a zero coefficient normalizing value for respective sub-blocks in accordance with the zero coefficient sum;

producing a transient weight signal for respective sub-blocks in accordance with the zero coefficient sum and a predetermined compression ratio; and summing the complexity normalizing value, the zero coefficient normalizing value and the transient weight signal, so as to produce the scale factor.

To attain the third object, there is provided an image coding apparatus comprising:

a discrete cosine transform unit for transforming a sub-block as time domain data into a discrete cosine transform coefficient as frequency domain data, with regard to an input image to be divided into sub-blocks composed of a predetermined number of unit blocks;

a quantizing unit for quantizing the discrete cosine transform coefficient at a predetermined quantization step size determined in accordance with a scale factor;

a variable-length coding unit for encoding the quantized coefficient into a variable-length code;

a complexity calculating unit for producing a complexity in accordance with a pixel value of an input image per sub-block;

a complexity normalizing unit for normalizing the complexity for respective sub-blocks;

a zero coefficient counting unit for counting the zero coefficient within a predetermined range per sub-block among in the discrete cosine transform coefficients transformed in the discrete cosine transform unit;

a zero coefficient normalizing unit for normalizing the zero coefficient for respective sub-blocks;

a weight calculating unit for producing a transient weight signal in accordance with the zero coefficient and a predetermined compression ratio; and a scale factor generator for summing the complexity normalizing value, the zero coefficient normalizing value and the transient weight signal, to generate the scale factor and supply the scale factor to the quantizing unit.

BRIEF DESCRIPTION OF THE DRAWINGS

The above objects and advantages of the present invention will become more apparent by describing in detail a preferred embodiment thereof with reference to the attached drawings in which:

FIGS. 2A–2C are diagrams of an input image according to the CCIR 601 format;

FIGS. 3A and 3B are composition maps with regard to the Y signal shown in FIG. 2A;

FIG. 5 is a block diagram according to one embodiment of an image coding apparatus of the present invention.

DETAILED DESCRIPTION OF THE INVENTION

FIGS. 2A–2C illustrate a 4:2:2 format of images based on recommendation document number 601 of the Consulfive Committee for International Radio (CCIR 601), and FIGS. 3A and 3B illustrate the composition of macro blocks with regard to the Y image (16×16 pixels). Each image is composed of Y (shown in FIG. 2A), Cr (shown in FIG. 2B), and Cb (shown in FIG. 2C) signals. Each of these respective signals is divided into sub-blocks called macro blocks. A macro block for the Y signal is composed of four 8×8 pixel block signals, or unit blocks, and a macro block for each of the Cr and Cb signals is composed of two 8×8 pixel block signals. FIG. 3A illustrates one frame of the Y signal, and FIG. 3B illustrates a macro block of 16×16 pixels with regard to the Y signal.

Figure 1:
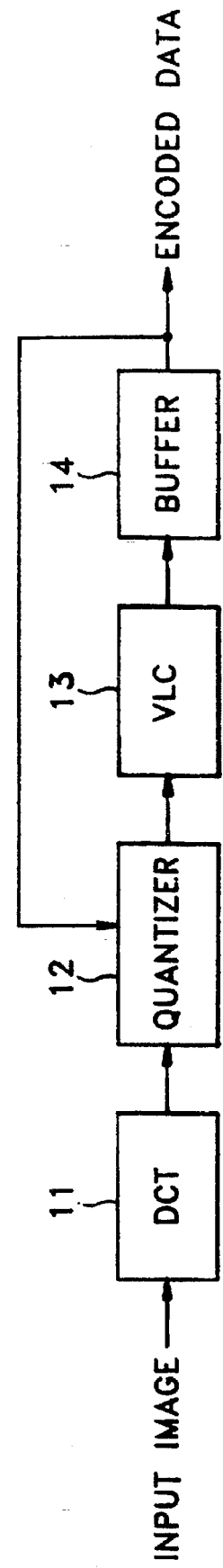
FIG. 1 is a block diagram of a conventional image coding apparatus.
Figure 4:
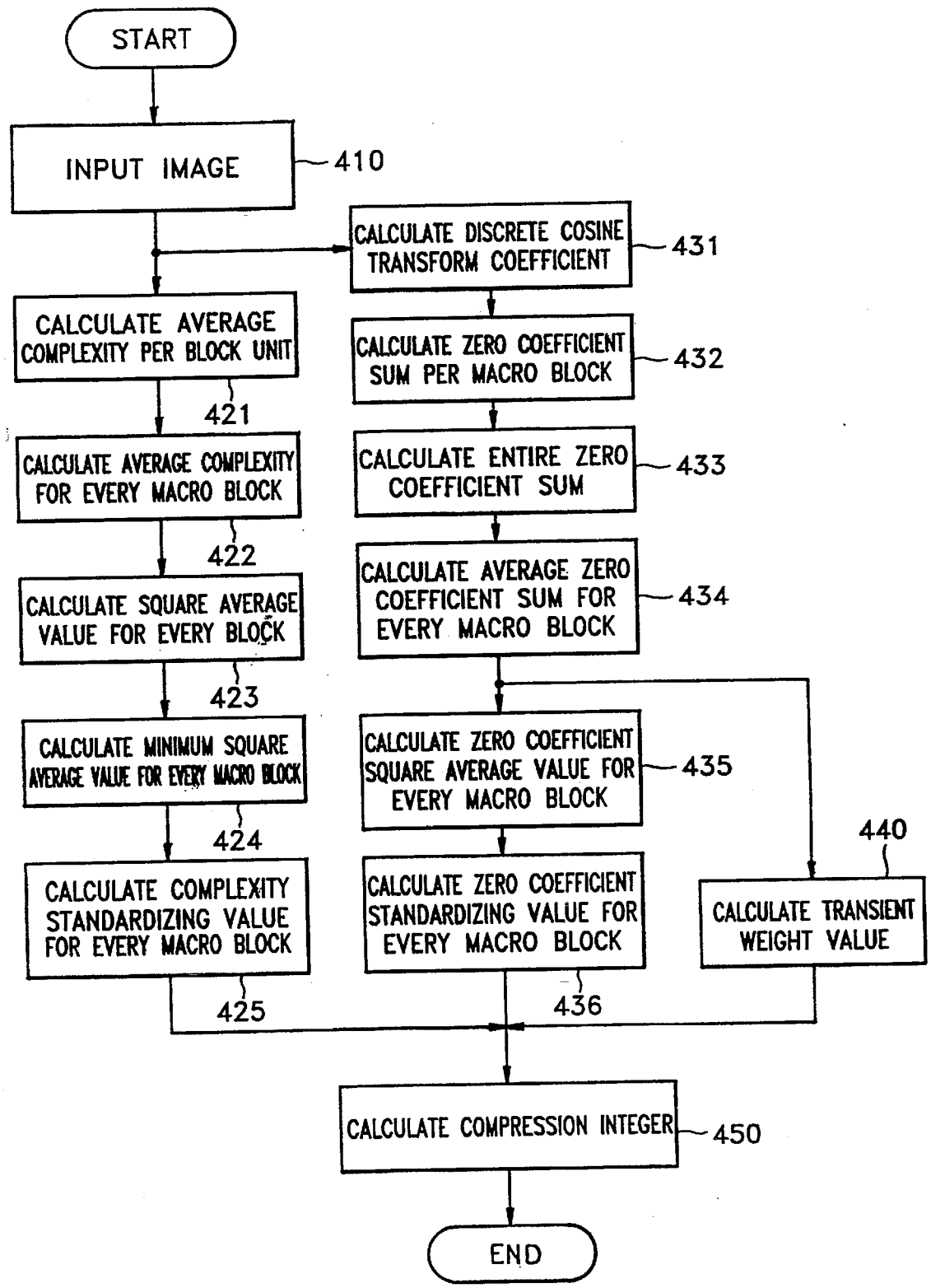
FIG. 4 is a flow chart for determining a scale factor according to an image coding method of the present invention.

FIG. 4 is a flow chart for determining a scale factor according to an image coding method of the present invention. The method for determining a scale factor on an input image is explained in more detail with reference to FIGS. 2A–C and 3A & 3B. In the following calculations of the method according to the present invention, Pix(k,l) is a pixel value where k and l are whole numbers ranging from 0 to 7, N refers to the number of blocks (in this embodiment, N=4), MB refers to the number of macro blocks (in this embodiment, MB=30×45), i refers to a number ranging from 0 to MB−1, and j refers to a number ranging from 0 to N−1.

As the first step, with regard to the input 4:2:2 format image (step 410), an average complexity of an image is produced per 8×8 block (hereinafter called a unit block) in a macro block (step 421). Such a value is produced in order to obtain a complexity normalizing value with regard to respective macro blocks in accordance with the complexity in the space domain.

The complexity is calculated with regard to the luminance signal Y, using pixel values of the image. The average complexity $A_{yb}[j]$ of a unit block j can be expressed by the following equation.

$$A_{yb}[j] = \frac{\sum_{k=0}^{7} \sum_{l=0}^{7} Pix(k,l)}{64}$$

An average complexity $A_{yr}[i]$ of a macro block i is produced by summing all the average complexities of unit blocks contained within the macro block and then dividing the sum by the number of unit blocks within the macro block (step 422).

$$A_{yr}[i] = \sum_{j=0}^{N-1} \frac{A_{yb}[j]}{N}$$

Here, a square average value $\sigma^2_{BT}[j]$ of a unit block j is produced with respect to the difference between the average complexity of the macro block and the real pixel value of the respective unit block within the macro block (step 423).

$$\sigma^2_{BT}[j] = \frac{\sum_{k=0}^{7} \sum_{l=0}^{7} (A_{yb}[j] - Pix(k,l))^2}{64}$$

Next, a minimum square average value among the square average values of the respective unit blocks with regard to the four Y unit blocks (j varies from 0 to 3) of a respective macro block, is produced. After the minimum square average value is produced, one is added to it to thereby reach the minimum square average value $\sigma^2_{BTmin}[i]$ of the respective macro block (step 424).

$$\sigma^2_{BTmin}[i] = MIN(\sigma^2_{BT}[j]) + 1$$

Here, a value of one is added to the minimum square average value so that the value does not equal zero.

Each macro block is normalized in accordance with the minimum square average value of the macro block and the average complexity of the macro block, so as to produce a complexity normalizing value $Nor_{ACT}[i]$ for the macro block (step 425).

$$Nor_{ACT}[i] = \frac{\alpha \sigma^2_{BTmin}[i] + A_{yr}[i]}{\sigma^2_{BTmin}[i] + \alpha A_{yr}[i]}$$

Here, $\alpha$ is a normalization constant.

As a second step, in order to obtain a zero coefficient normalizing value and a transient weight signal for a respective macro block in a frequency domain of an image signal, a discrete cosine transform (DCT) operation is performed on the input 4:2:2 format image, so as to produce a coefficient $Pix_{Coeff}(u,v)$ (step 431).

$$Pix_{Coeff(u,v)} =$$

$$\frac{1}{4} C(u)C(v) \sum_{k=0}^{7} \sum_{l=0}^{7} Pix(k,l) \cos\frac{\pi u(2k+1)}{16} \cos\frac{\pi v(2l+1)}{16}$$

Here, u and v are integers ranging from 0 to 7 and when zero, C(u) and C(v) are equal to $1/\sqrt{2}$, but are otherwise equal to one.

Within the macro block, all Y blocks whose discrete cosine transform coefficient is greater than or equal to $-1$ and less than or equal $+1$, are counted, so as to produce a zero coefficient sum Z[i] for the macro block (step 432).

$$Z[i] = \sum_{j=0}^{3} \sum_{k=0}^{7} \sum_{l=0}^{7} Zero_{Coeff[j][k][l]}$$

The zero coefficient sums of the respective macro blocks are summed, so as to produce an overall zero coefficient sum Zr for all macro blocks (step 433).

$$Zr = \sum_{i=0}^{MB-1} Z[i]$$

The overall zero coefficient sum is divided by the number of macro blocks, so as to produce an average zero coefficient sum $A_{ZERO}$ of the macro blocks (step 434).

$$A_{ZERO} = \frac{Zr}{MB}$$

The difference between the average zero coefficient sum of the macro blocks and the zero coefficient sum of the macro blocks is squared, to produce a zero coefficient square average value $\sigma^2_{ZERO}[i]$ of the macro blocks (step 435).

$$\sigma^2_{ZERO}[i] = (A_{ZERO} - Z[i])^2$$

Normalization is performed in accordance with the zero coefficient square average value and the zero coefficient sum per macro block, so as to produce a zero coefficient normalizing value $Nor_{ZERO}[i]$ for the respective macro blocks (step 436).

$$Nor_{ZERO}[i] = \frac{\alpha Z[i] + \sigma^2_{ZERO}[i]}{Z[i] + \alpha \sigma^2_{ZERO}[i]}$$

Here, $\alpha$ is a normalization constant.

The scale factor is varied in accordance with the complexity of an image and the quantization step size interval is determined by this scale factor. Since the quantization step size can be varied in accordance with the generation of zero coefficients and the scale factor is controlled in accordance with the compression ratio, the transient weight W of the scale factor can be expressed as follows.

$$W = \frac{A_{ZERO} - \beta R}{\gamma}$$

Here, $\beta$ and $\gamma$ are weight constants and R represents a predetermined compression ratio.

Accordingly, a transient weight W for respective macro blocks is produced in accordance with an average zero coefficient sum and a compression ratio of macro block (step 440).

Therefore, the scale factor SF[i] for a macro block is determined by the sum of the complexity normalizing value, the zero coefficient normalizing value and the transient weight (step 450).

$$SF[i] = Nor_{ACT}[i] + Nor_{ZERO}[i] + W$$

The quantization step size is determined by the scale factor, where the quantization step size for the DCT coefficient is determined in accordance with a quantizing matrix in the quantizer.

In other words, the greater the average zero coefficient sum of a macro block and the smaller the compression ratio, the greater the transient weight W. If the transient weight is increased, the scale factor is increased and the quantizing interval is decreased.

FIG. 5 is a block diagram according to one embodiment of an image coding apparatus of the present invention. In addition to a discrete cosine transform (DCT) unit 51, a quantizer 58, and a variable-length coding (VLC) unit 59 which are similar to those disclosed in the prior art systems, the apparatus further comprises elements for producing a scale factor based on an input image. Here, the DCT unit 51 performs a discrete cosine transform function on macro block data as time-domain data, transforming it into DCT coefficients as frequency-domain data, with respect to an input image divided into macro blocks for the Y, Cr and Cb signals. Quantizer 58 quantizes the DCT coefficients which are output from DCT unit 51, at a predetermined quantization step size. VLC unit 59 produces coding data having a variable length in accordance with the information quantity, which results in minimizing the overall number of bits for coding.

Hereinafter, the additive elements are explained referring to FIG. 5.

A complexity calculator 52 produces a complexity signal in accordance with the pixel values of an input image signal. A complexity normalizing unit 53 normalizes the complexity signal for respective macro blocks, producing a complexity normalizing signal containing a complexity normalizing value.

A zero coefficient counter 54 counts the zero coefficients which are greater than or equal to $-1$ and less than or equal to $+1$, among the DCT coefficients output from DCT unit 51. A zero coefficient normalizing unit 55 normalizes the zero coefficients for the respective macro blocks.

A weight value calculator 56 calculates a transient weight for each macro block, based on the zero coefficient counted in zero coefficient counting unit 54 and the predetermined compression ratio. An adder 57 sums the complexity normalizing value, the zero coefficient normalizing value and the transient weight, so as to output a scale factor to quantizer 58.

The quantization step size for the DCT coefficient is determined based on the scale factor output from quantizer 58 and based on the quantizing matrix. The quantizing matrices for all input images are different in accordance with the degree of activity, the characteristics of color components, the resolution, and the object of application. The result is that a suitable quantizing matrix is produced. This quantizing matrix is determined in consideration of various psychological and visual experiments which are coupled to the human visual sense characteristics and the characteristics of DCT coefficients.

Quantizer 58 quantizes the image signal in accordance with the determined quantization step size. The quantized results are applied to VLC unit 59, so as to produce a compressed bit stream having the desired bit ratio.

Though the coding is made such that the macro blocks should have a constant bit rate in the above embodiment of the present invention, it is possible for a larger block than the macro block to have a constant bit rate.

As described above, the present invention produces a scale factor for coding with a constant bit rate, in accordance with the complexity in the space domain and the complexity in the frequency domain (which corresponds to the generation of a zero coefficient) for an input image. This scale factor is used to control the quantization step size of the quantizer, which leads to the effect that the coding can be accomplished with a constant bit rate and with no deterioration of image quality, even for an image frame composed of images having different complexities.

What is claimed is:

1. An image coding method for dividing an input image signal into a plurality of sub-blocks composed of a predetermined number of unit blocks, quantizing the divided image signal by a quantization step size determined in accordance with a scale factor, and then coding the quantized image signal, the image coding method comprising the steps of:

producing a complexity normalizing signal of a sub-block, based on a complexity in the space domain of the input image signal;

producing a zero coefficient sum by performing a discrete cosine transform operation on the input image signal, which produces discrete cosine transformation coefficients for the sub-block, and counting the discrete cosine transform coefficients having a value within a predetermined range;

producing a zero coefficient normalizing value for the sub-block in accordance with said zero coefficient sum;

producing a transient weight signal for the sub-block in accordance with said zero coefficient sum and a predetermined compression ratio; and producing the scale factor by summing said complexity normalizing signal, said zero coefficient normalizing value and said transient weight signal.

2. An image coding method according to claim 1, wherein said step of producing a complexity normalizing signal is performed for a luminance signal.

3. An image coding method according to claim 1, wherein said predetermined range is from −1 to +1.

4. An image coding method according to claim 3, wherein, in said step of producing a zero coefficient sum, the discrete cosine transform coefficient equal to or greater than −1 and equal to or lower than +1 is the coefficient for a luminance signal of the input image signal.

5. An image coding method according to claim 1, wherein said sub-block is a macro block.

6. An image coding method according to claim 5, wherein said macro block is comprised of four 8-pixel×8-pixel unit blocks, for a luminance signal.

7. An image coding method according to claim 5, wherein said step of producing a complexity normalizing signal comprises the steps of:

producing an average complexity signal for each unit block in a macro block;

producing an average complexity signal for the macro block based on said average complexities of the unit blocks; producing a square average value of a unit block by producing a difference between said average complexity signal of said unit block and a real pixel value of said unit block;

producing a minimum square average value of the macro block by adding a value of one to a minimum value of said square average values of the unit blocks in a macro block; and producing a complexity normalizing signal for each macro block by normalizing the macro block in accordance with said minimum square average value and said average complexity signal of the macro block.

8. An image coding method according to claim 5, wherein said step of producing a zero coefficient normalizing value comprises the steps of:

producing an overall zero coefficient sum by summing the zero coefficient sums of the macro blocks;

producing an average zero coefficient sum of the macro blocks, in accordance with said overall zero coefficient sum;

producing a zero coefficient square average value of the macro block in accordance with a difference between said average zero coefficient sum of the macro blocks and said zero coefficient sum of the macro block; and producing a zero coefficient normalizing value for each macro block by normalizing the macro block in accordance with said zero coefficient square average value and said zero coefficient sum of the macro block.

9. An image coding method according to claim 5, wherein the step of producing a transient weight signal further comprises the steps of:

producing an overall zero coefficient sum by summing said zero coefficient sums;

producing an average zero coefficient sum of the macro blocks in accordance with said overall zero coefficient sum; and producing a transient weight signal of the macro block in accordance with said average zero coefficient sum of the macro blocks and a predetermined scale factor.

10. An image coding apparatus comprising:

a discrete cosine transform unit for performing a discrete cosine transform function on a sub-block as time-domain data so as to output a discrete cosine transform coefficient as frequency-domain data, wherein an input image signal is divided into sub-blocks composed of a predetermined number of unit blocks;

a quantizing unit for quantizing said discrete cosine transform coefficient by a predetermined quantization step size determined in accordance with a scale factor;

a variable-length coding unit for encoding the quantized coefficient into a variable-length code;

a complexity calculating unit for producing a complexity signal in accordance with a pixel value of a sub-block of the input image signal;

a complexity normalizing unit for normalizing the complexity signal for the sub-block, and outputting a complexity normalizing signal;

a zero coefficient counting unit for counting zero coefficients of the sub-block which are the discrete cosine transform coefficients from the discrete cosine transform unit within a predetermined range;

a zero coefficient normalizing unit for normalizing said zero coefficient of the sub-blocks;

a weight calculating unit for producing a transient weight signal in accordance with said zero coefficient and a predetermined compression ratio; and a scale factor generator for summing said complexity normalizing signal, said zero coefficient normalizing value and said transient weight signal, to generate said scale factor, and supplying said scale factor to said quantizing unit.

11. An image coding apparatus according to claim 10, wherein said sub-block is a macro block.

12. An image coding apparatus according to claim 11, wherein said macro block is comprised of four 8-pixel×8-pixel unit blocks, for a luminance signal.

13. An image coding apparatus according to claim 10, wherein said predetermined range is from −1 to +1.

* * * * *